US010028278B2

United States Patent
Schmidt

(10) Patent No.: US 10,028,278 B2
(45) Date of Patent: Jul. 17, 2018

(54) METHOD FOR SENDING AND RECEIVING MESSAGES IN AN ENERGY-AUTONOMOUS RADIO SYSTEM OR A RECEIVER SYSTEM, AND CORRESPONDING RADIO SYSTEM AND RECEIVER SYSTEM

(71) Applicant: EnOcean GmbH, Oberhaching (DE)

(72) Inventor: Frank Schmidt, Altkirchen (DE)

(73) Assignee: ENOCEAN GMBH, Oberhaching (DE)

( * ) Notice: Subject to any disclaimer, the term of this patent is extended or adjusted under 35 U.S.C. 154(b) by 16 days.

(21) Appl. No.: 14/910,981

(22) PCT Filed: Aug. 8, 2014

(86) PCT No.: PCT/EP2014/067124
§ 371 (c)(1),
(2) Date: Feb. 8, 2016

(87) PCT Pub. No.: WO2015/018939
PCT Pub. Date: Feb. 12, 2015

(65) Prior Publication Data
US 2016/0198468 A1 Jul. 7, 2016

(30) Foreign Application Priority Data

Aug. 9, 2013 (DE) .......................... 10 2013 108 654
Aug. 9, 2013 (DE) .......................... 10 2013 108 660

(51) Int. Cl.
*H04W 72/04* (2009.01)
*H04W 52/02* (2009.01)
(52) U.S. Cl.
CPC ... *H04W 72/0453* (2013.01); *H04W 52/0258* (2013.01); *H04W 52/0277* (2013.01); *Y02B 60/50* (2013.01)
(58) Field of Classification Search
None
See application file for complete search history.

(56) References Cited

U.S. PATENT DOCUMENTS

2003/0143963 A1* 7/2003 Pistor ...................... H04B 1/04
455/127.1
2005/0208935 A1* 9/2005 Mountney ............. H04W 16/14
455/422.1
(Continued)

FOREIGN PATENT DOCUMENTS

DE         10315764 A1     10/2004
EP       2 426 865 A2       3/2012
(Continued)

OTHER PUBLICATIONS

International Search Report and Written Opinion for PCT Appl. No. PCT/EP2014/067124, dated Jan. 12, 2015.

*Primary Examiner* — Kodzovi Acolatse
(74) *Attorney, Agent, or Firm* — Foley & Lardner LLP; James De Vellis

(57) ABSTRACT

The invention relates to a method for sending messages in an energy self-sufficient radio system, wherein an electric power for the radio system is provided by an energy converter that converts nonelectrical primary energy from the environment into electric power. The method comprises the steps of storage of at least two transmission channels in the radio system, presetting of a transmission unit of the radio system to a preferred stored transmission channel, checking of a use of the preferred transmission channel by other radio systems and if necessary changing from the preferred transmission channel to another stored transmission channel if the preferred transmission channel is in use, and sending of a predetermined radio message by the transmission unit on the preferred or the other transmission channel. The energy converter is excited by a mechanical operation of an operating element of the radio system, as a result of which electric power for performing the method is provided, and wherein each operation of the operating element prompts the performance of at least one portion of the above method. In (Continued)

addition, a reception method and also a radio system and a receiver system for performing the corresponding methods are described. One conceivable application described is an initialization method.

35 Claims, 3 Drawing Sheets

(56) References Cited

U.S. PATENT DOCUMENTS

| | | | |
|---|---|---|---|
| 2007/0146130 A1* | 6/2007 | Hannemann | A61B 6/145 340/539.22 |
| 2008/0126005 A1* | 5/2008 | Guenter | G01F 23/0061 702/140 |
| 2009/0023458 A1* | 1/2009 | Mountney | H04W 16/14 455/456.1 |
| 2010/0003937 A1* | 1/2010 | Schmidt | H03D 1/02 455/205 |
| 2011/0272261 A1 | 11/2011 | Johnson et al. | |

FOREIGN PATENT DOCUMENTS

| | | |
|---|---|---|
| GB | 2 425 160 A | 10/2006 |
| WO | WO-2006/067271 A1 | 6/2006 |
| WO | WO-2009/018215 A1 | 2/2009 |

\* cited by examiner

METHOD FOR SENDING AND RECEIVING MESSAGES IN AN ENERGY-AUTONOMOUS RADIO SYSTEM OR A RECEIVER SYSTEM, AND CORRESPONDING RADIO SYSTEM AND RECEIVER SYSTEM

CROSS-REFERENCE TO RELATED APPLICATIONS

The present application is a U.S. National Stage under 35 U.S.C. § 371 of PCT International Application Number PCT/EP2014/067124, filed Aug. 8, 2014, which claims priority to DE 102013108660.8, filed Aug. 9, 2013 and DE 102013108654.3, filed Aug. 9, 2013. The contents of the foregoing applications are incorporated herein by reference in their entireties.

The invention relates to a method for sending messages in an energy self-sufficient radio system, a method for ascertaining a suitable reception channel of a receiver system and also a corresponding radio system and a corresponding receiver system.

Following teaching or initialization or following what is known as "pairing" with corresponding receiver systems in radio networks, transmitters or transmission systems or radio systems, specifically energy self-sufficient radio systems, transmitters or transmission arrangements, send on the taught frequency or the taught transmission channel, regardless of the current ambient situation, i.e. regardless of the current use of the available transmission channels.

This can disadvantageously result in radio messages from the radio systems no longer being able to be sent correctly if the radio systems send on channels that are in use by one or more further transmitters in the surroundings. In this case, radio technologies of different coexisting systems can clash and result in negative interference that disrupts data interchange by system components among one another. Particularly in the case of joint use of radio standards in networks, such as Bluetooth (IEEE 802.15.1), WLAN (IEEE 802.11) or WPAN (802.15.4, e.g. Zigbee), which serve a frequency range between 2.4 GHz and 2.4835 GHz, negative interfering effects can arise if radio communication by different systems is performed within the same frequency bands.

In environments with heavy radio traffic, it is also often a disadvantage for receiver systems to set out from a rigid number of preset reception channels. If these channels are in heavy use by excessive radio traffic, there is an increase in interference sensitivity in the reception systems, with radio messages no longer being able to be received correctly or sometimes no longer being able to be received at all.

Centrally controlled systems, such as systems that use the "Zigbee" transmission protocol, can allocate fixed time windows (what are known as timeslots) to the individual subscribers for sending and/or can allocate other, free frequencies to the subscribers. General instructions for a complete change of channel are also conceivable.

For energy self-sufficient radio systems (transmitters or transmitter arrangements) having an energy converter that converts ambient energy into electric operating power, however, this is usually not possible or possible only with a great deal of trouble, since a continual or lengthy reception standby mode that is required for this purpose is too energy intensive.

It is therefore an object of the invention to propose a transmission or reception method and corresponding radio or receiver systems that allow more reliable and more interference-free transmission of radio messages particularly for energy self-sufficient radio systems.

A first aspect of this object is achieved by a method for sending messages in an energy self-sufficient radio system according to claim 1.

This method involves an electric power for the radio system being provided by an energy converter that converts nonelectrical primary energy from the environment into electric power.

In addition, the method comprises the following steps:
a.) storage of at least two transmission channels in a predetermined frequency range in the radio system,
b.) presetting of a transmission unit of the radio system to a preferred stored transmission channel,
c.) checking of a use of the preferred transmission channel by other radio systems,
d.) changing from the preferred transmission channel to another stored transmission channel if the preferred transmission channel is in use, and
e.) sending of a predetermined radio message by the transmission unit on the preferred or the other transmission channel on the basis of step d.).

The energy converter is excited by a mechanical operation of an operating element of the radio system, as a result of which electric power for performing the method is provided. Advantageously, each operation of the operating element prompts the performance of at least steps c.) to e.) above.

Such a method has the advantage that flexibility for the choice of a transmission channel is achieved that allows a reaction to a use of a particular, initially set (preferred) transmission channel by other radio systems by performing a change of channel.

The change of channel is advantageously made on the basis of whether a check of the use of the preset transmission channel has revealed that it is in use. In this case, there is a change to a different channel. Otherwise, the preset channel is retained.

This method simply but efficiently allows handling of a radio traffic in the case of coexisting radio systems that use particularly the same frequency bands or transmission channels within a particular frequency range. Precisely for energy self-sufficient radio systems of the type explained above that produce an operating power by means of a built-in energy converter, this method is advantageous. Radio systems do not have to be continually or lengthily in a reception standby mode in order to perform corresponding channel matching operations. The radio systems instead spontaneously condition a choice of channel on the basis of the measures explained above.

A mechanical operation of an operating element of the radio system is advantageously matched to an excitement of the energy converter used such that just a single instance of operation of the operating element provides sufficient electric power to perform selected or all method steps explained above.

In connection with the method explained above, the term "radio system" is intended to describe a system that is embodied as a transmission/reception system, which can thus perform not only sending of a radio message but also monitoring of a transmission channel, but whose operation is used (primarily) for sending radio messages (i.e. the operation of a transmitter). By way of example, this can relate to a radio light switch or other automatic radio switching systems.

Advantageously, one or more of steps c.) to e.) above are repeatedly performed for the preferred transmission channel and/or for at least one further stored transmission channel. As a result, it is sometimes possible for a plurality of transmission channels to be checked for a use in the plurality of iterations and/or if need be for an iterative change to another transmission channel to be performed. It is also possible to use a plurality of transmission channels to iteratively send a plurality of radio messages. This has the advantage that interference or use of one or more transmission channels prompts radio messages to reach a reception system on a different transmission channel, so that data interchange is possible despite a high level of use in the transmission network.

Preferably, for each stored transmission channel, repeated checking on the use according to step c.) above is used to ascertain a statistical probability of use. Advantageously, a stored transmission channel having the lowest probability of use is set as the preferred transmission channel according to step b.) above. These measures allow a preferred transmission channel to be set on the basis of the ascertained statistical probability of use. This can, if need be, be ascertained periodically at prescribed instants for each stored transmission channel and provides information about the use of a corresponding transmission channel. Said measures therefore always allow a preferred transmission channel to be ascertained that is statistically the "freest" channel having the lowest probability of use.

As an alternative to a probability of use, it is also possible to use other statistical gauges for general ascertainment of an interference sensitivity of a corresponding transmission channel. It is thus also possible to use parameters such as signal-to-noise ratios, power spectral densities or the like in order to make a choice of transmission channel.

Preferably, the method of the type explained involves stored transmission channels being erased if the statistical probability of use thereof exceeds a predetermined limit value.

Preferably, as an alternative or in addition to the above measures, for one or more nonstored transmission channels, repeated checking on the use is used to ascertain a statistical probability of use. These transmission channels are stored according to step a.) above if the statistical probability of use thereof is below the predetermined limit value.

These measures can advantageously be used to perform dynamic transmission channel matching and also matching for the stored transmission channels. If one or more stored transmission channels do not (any longer) satisfy a predetermined criterion, they can be erased from a list of stored transmission channels. Conversely, initially nonstored transmission channels can be included in the list of stored transmission channels if they meet the prescribed criteria. This also allows an alteration of a distributed radio network and the utilization level thereof to be involved in matching of the transmission channels.

Advantageously, the method of the type explained is used in a predetermined frequency range having transmission frequencies between 2.4 GHz and 2.4835 GHz, e.g. according to the IEEE 802.15.4 standard. Popular transmission protocols in the corresponding radio networks are frequently used in such a frequency band. Alternatively or additionally, it is also possible for a frequency range between 5.725 GHz and 5.875 GHz to be taken into consideration.

Advantageously, the energy converter is excited electrodynamically by an instance of mechanical operation of a rocker switch as an operating element of the radio system, and as a result the mechanical energy introduced via the rocker switch is converted into electric power for supplying power to the radio system. The energy converter is advantageously an inductively operating converter, wherein a relative movement by a permanently magnetic material in relation to a coil induces electric current in the coil according to the induction law and this provides operating power for operating the radio system. By way of example, the radio system may be embodied as a light switch that is operated via the rocker switch. On the basis of the operation, operating power is provided by means of the energy converter, so that the above method of transmission of a radio message coupled with choice of a channel can be performed.

By way of example, a command for switching on a light source that is connected to a corresponding receiver system may be coded in the radio message. Naturally, other commands or instructions are also conceivable, such as ON, OFF, DIM, etc. It is also conceivable for other applications to be provided. By way of example, the radio system could also comprise a sensor for detecting a window position, wherein closing or opening the window brings about mechanical operation of the rocker switch. A corresponding radio signal could then be sent to a heating control for room temperature regulation, for example.

According to one embodiment, a trip element of the energy converter is operated by means of the mechanical energy introduced via the rocker switch. In the case of inductive excitation of the energy converter, the trip element can carry a permanent magnet or an induction coil, for example, which perform a relative movement in relation to the respective other element (permanent magnet or coil). In particular, the trip element may be designed such that large relative movements and/or operating forces are not required in order to excite the energy converter. By way of example, the trip element is operated at an operating force of between 3 and 15 N over an operating path of between 0.5 mm and 10 mm at room temperature. By way of example, in one possible embodiment of the radio system, the trip element is operated at an operating force of between 5 and 10 N over an operating path of between 1 mm and 3 mm at room temperature. This corresponds to conventional operation of a switch and is sufficient to produce sufficient operating power using the energy converter, so that the above method can be performed.

Advantageously, the radio system stores an identification number for identifying the radio system. Preferably, the identification number is transmitted on each sending of a radio message by the transmission unit according to step e.) above.

Besides identification parameters of the radio system itself, such as a distinguishable device ID (in some cases prescribed at the factory), and/or an instruction for a receiver system, it is also possible for other information to be coded in the radio message. By way of example, this other information can also relate to information about the stored transmission channels and the properties thereof, such as interference sensitivity, probability of use, etc.

A further aspect of the above object is achieved by a radio system according to claim 14. The radio system comprises an energy converter for converting nonelectrical primary energy from the environment into electric power. The energy converter can be excited by an instance of mechanical operation of an operating element of the radio system.

In addition, the radio system comprises a switching unit that is set up to convert an instance of mechanical operation of the operating element into a logic signal and to generate a predetermined radio message therefrom.

In addition, the radio system comprises a transmission unit for sending the predetermined radio message on one or more transmission channels stored in the radio system.

Advantageously, the radio system is set up to perform a method according to the type explained above.

The radio system may be embodied such that different user operations and/or modes of operation are identifiable and codable. By way of example, the switching unit may be set up such that different contact points by the operating element lead in different ways to the closure of an electrical contact with a board, so that different logic signals are produced. These logic signals can then each be allocated to a separate user option or a separate operating state. By way of example, it is conceivable for four contact blades, one in each quadrant, to be provided on the switching unit, contact with the contact blades being able to be made by rocker movements upward or downward coupled with pressing on the right-hand and left-hand side of the rocker switch, and thus four different user options being codable. It is also conceivable for more than one rocker switch to be provided. This allows a multiplicity of different operating states to be coded and to be controlled by the radio module.

A further aspect of the above object is achieved by a method for ascertaining a suitable reception channel of a receiver system according to claim 15.

The method comprises the steps of:
a.) storage of at least two reception channels in a predetermined frequency range in a receiver system,
b.) presetting of a reception unit of the receiver system to a preferred stored reception channel,
c.) ascertainment of a statistical channel availability of the stored reception channels on the basis of repeated checking on a reception signal level of each stored reception channel,
d.) selection of a stored reception channel having the highest channel availability as the preferred reception channel.

These measures have the advantage that improved consideration can be given to the use, utilization level and accordingly changing interference immunity at the radio channels used at the receiver end, too, in a radio network. In particular, a channel availability is ascertained from (repeated) checking on a reception signal level of each stored reception channel. This channel availability can comprise a statistical probability of use, for example, or even other gauges. It is thus also possible to use parameters such as signal-to-noise ratios, power spectral densities or the like in order to make a choice of channel at the receiver end.

Such measures are particularly advantageous when using autonomous-power radio systems as transmitters, because this allows an improved channel choice to be made on the receiver systems without the other side (the sending radio systems) needing to be notified of corresponding changes of channel.

Advantageously, a decision about a choice of channel on a sending radio system of the type explained above correlates with a decision about a choice of channel on a receiving receiver system. The effect that can be achieved by this is that a radio system takes an ascertained probability of use and a possibly associated change of channel as a basis for selecting a preferred transmission channel that is also preferably used for reception on a corresponding reception system on the basis of the measures explained above.

In addition, it is also possible—as explained above—to implement iterative performance of the individual method steps on both sides for different channels, so that, despite different preferred channels, radio messages are transmitted on a plurality of channels and there is an increased probability of a radio message being transmitted successfully, even if the preferred channels are selected differently on both sides (transmitter and receiver).

In connection with the method explained above, the term "receiver system" is intended to describe a system that is embodied as a transmission/reception system, which can thus perform not only reception of a radio message but also sending of telegrams on a (return) channel, but whose operation is used (primarily) for receiving radio messages (i.e. the operation of a receiver). This can relate to ceiling lighting or other automatic receiver systems.

By way of example, a reception method of the above type can be performed by means of a receiver system having just one receiver, with the receiver selecting and determining a suitable reception channel in accordance with the measures explained above.

A further aspect of the above object is achieved by a receiver system according to claim 17.

The receiver system comprises a receiver and a logic unit. In this case, the receiver is advantageously designed for (wideband) reception on all stored reception channels simultaneously. The receiver may be embodied in the form of a digital signal processor (DSP), for example, that samples the signal over a wide bandwidth with very high signal sampling while observing the sampling criterion for complete signal recovery. Digital filters (bandpass filters) can then be used to filter and decode the individual radio messages for the different channels.

As an alternative to the above embodiment, a receiver system according to claim 18 is conceivable that comprises at least two receivers and a logic unit. In this case, advantageously, a respective reception channel of the stored reception channels has a respective associated receiver that monitors this reception channel.

The latter embodiment of a receiver system has the advantage that it can be embodied relatively inexpensively.

In the case of both alternatives for a corresponding receiver system, one advantage is that a plurality of reception channels are monitored simultaneously, thus reducing the risk of a loss of information from unreceived messages.

The text below presents a list of additional aspects that can be taken into account in a corresponding transmission or reception method of the type explained.

1) Method for (energy self-sufficient) sending, comprising the steps of:
a. Stipulation of a list of preferred transmission channels from a list of possible transmission channels;
b. Checking on whether a first preferred transmission channel, from the list of preferred transmission channels, is in use;
c. Sending if the first preferred transmission channel is not in use; and
d. Repetition of the steps from a) for at least one further preferred transmission channel, from the list of preferred transmission channels.

2) Method for (energy self-sufficient) sending according to aspect 1, wherein the list of preferred transmission channels has more than two entries.

3) Method for (energy self-sufficient) sending according to either of the preceding aspects, wherein the electric power required for performing the method is provided by converting nonelectrical primary energy from the surroundings into electric power.

4) Method for (energy self-sufficient) sending according to one of the preceding aspects, wherein the method is terminated after a predetermined number of sending processes.

5) Method for (energy self-sufficient) sending according to aspect 4, wherein the method is terminated after two sending processes.

6) Method for (energy self-sufficient) sending according to aspect 4, wherein the method is terminated after three sending processes.

7) Method for (energy self-sufficient) sending according to one of the preceding aspects, wherein the transmission channels, from the list of possible transmission channels, have a transmission frequency of between 2.4 GHz and 2.4835 GHz.

8) Method for (energy self-sufficient) sending according to aspect 7, wherein the sending complies with the IEEE 802.15.4 standard.

9) Method for (energy self-sufficient) sending according to either of aspects 7 and 8, wherein the list of preferred transmission channels comprises particularly transmission channels having transmission frequencies that are not used by the IEEE 802.11 standard or have low statistical use.

10) Method for (energy self-sufficient) sending according to one of aspects 7 to 9, wherein the first preferred transmission channel is a transmission channel having a transmission frequency that is not used by the IEEE 802.11 standard or has low statistical use.

11) Method for ascertaining a suitable reception channel, comprising the steps of:
a. Ascertainment of the rate of use of a first reception channel, from a list of possible reception channels, over a time T;
b. Comparison of the rate of use with a prescribed criterion;
c. Storage of the rate of use of the first reception channel when the prescribed criterion is not satisfied and ascertainment of the rate of use for at least one further reception channel from the list of possible reception channels;
d. Choice of a reception channel, from the list of possible reception channels, on the basis of the stored rates of use; wherein the method is terminated immediately on ascertainment of a reception channel having a rate of use that satisfies the prescribed criterion, and the current reception channel is chosen as the new reception channel.

12) Method for ascertaining a suitable reception channel according to aspect 11, wherein the rate of use is ascertained as a maximum up until a prescribed number of stored rates of use is reached.

13) Reception arrangement, having a receiver and at least one logic unit,
wherein the receiver arrangement is suitable for performing the method according to aspect 11 or 12.

14) Reception arrangement according to aspect 13, wherein the receiver is designed to receive on all channels from the list of possible reception channels simultaneously.

15) Reception arrangement having at least
   two receivers; and
   one logic unit,
wherein the arrangement is suitable for performing the method according to aspect 11 or 12 and wherein the arrangement is designed to receive on a plurality of channels from the list of possible reception channels in parallel.

16) Reception arrangement according to one of aspects 13 to 15, wherein the arrangement is designed to perform the method according to aspect 11 or 12 periodically.

The use of a radio system in an initialization method is described by way of example below.

Advantageously, the transmission of a corresponding initialization message of the type below can be combined with a preceding choice of channel according to the type explained above in order to ensure reliable and interference-free initialization.

A first configuration of the initialization method uses the length of operation of a switch in order to prompt the transmission of an initialization message on a particular frequency. A switch has at least one operating element, and ideally it has a plurality of operation elements, e.g. two rocker switches and hence four possible positions. When the rocker switch is operated into one of its two possible positions, the energy converter in the transmission arrangement that is connected to the rocker switch is operated in order to provide power. In addition, a timer is started in the logic unit of the transmission arrangement.

When the rocker switch is released, the value of the timer is read by the logic and compared with a prescribed criterion. If the criterion is satisfied, an initialization message is transmitted by the transmission unit to the transmission arrangement. For the practical application of the switch, it is conceivable, by way of example, for the switch to be put into the initialization mode by pressing for a long time (e.g. 10 sec.). If there are a plurality of operating elements present (e.g. a plurality of rocker switches), each switch position in the initialization mode may be associated with a particular transmission frequency or sometimes with a particular transmission channel of the above type.

This therefore allows transmission of initialization messages on different frequencies or on different transmission channels so as ultimately to teach the switch a frequency that is currently used by the radio network. The switch position in the initialization mode determines the further transmission frequency of the switch until the switch is next initialized. By way of example, the radio network can use what is known as the "Zigbee Green Power" radio protocol. The different transmission frequencies or transmission channels can be determined by means of measures for choosing the transmission channel that are explained above.

When the switch is pressed normally (over a comparatively short period), the timer is likewise started but does not satisfy the prescribed criterion. As a result, the logic remains in the normal mode of operation and transmits the message associated with the operating element according to a user operation (e.g. light on, light off or dim, etc.). Ideally, the operating element is operatively connected to the logic unit of the transmission arrangement such that the operation and release of the operating element can be detected by the logic unit.

According to a second configuration of the initialization method, which is particularly suitable for switches having just one operating element, the initialization mode is started by particular chronologies of switch pressing. When the switch is pressed at particular intervals of time, the initialization mode is started and an initialization message is transmitted on a particular frequency or on a transmission channel (previously selected according to the above measures). Different chronologies of pressing allow initialization messages to be transmitted on different frequencies. As in the first embodiment, the transmission frequency of the switch is determined by the transmission frequency of the last initialization. The use of chronologies allows a multiplicity of radio frequencies or transmission channels to be covered by the switch, regardless of the form of the switch.

In a third configuration, which is suitable for switches having more than one operating element, the order of operation of the various operating elements is used to start the initialization mode instead of a chronology of instances of operation. If the switch again has two rocker switches and hence four positions, it is possible to use the succession of positions 1-2-3-4-3-2-1, for example, in order to put the transmission arrangement into the initialization mode and to transmit an initialization message. Different switch combinations can again cover different frequencies or transmission channels.

The method is suitable for initializing or pairing sensor arrangements in or with radio networks in all frequency ranges, but particularly in the free 2.4 GHz frequency band, which can be used worldwide. The method is likewise suitable in radio networks that use the "Zigbee Green Power" standard. It is therefore advantageous if the transmitted messages at least satisfy the IEEE 802.15.4 standard.

The method is geared particularly to autonomous-power radio switches that have a transmission arrangement and are supplied with electric power by an integrated energy converter. Advantageously, such radio systems in combination with a corresponding initialization method perform a change for a plurality of transmission channels, as explained earlier on.

One transmission arrangement that is used can have four operating elements and an induction converter, for example, that can have an external force applied to it via a mechanism (e.g. by means of a rocker switch). The joint operation of the operating element and the energy converter ensures that power is supplied to the transmission arrangement.

All measures, method steps or aspects of the methods explained here as a whole can also be applied to corresponding receiver systems and radio systems as transmitters and transferred in the form of substantive features, and vice versa.

The invention is explained in more detail below with reference to a plurality of drawings, in which.

Figure 1:
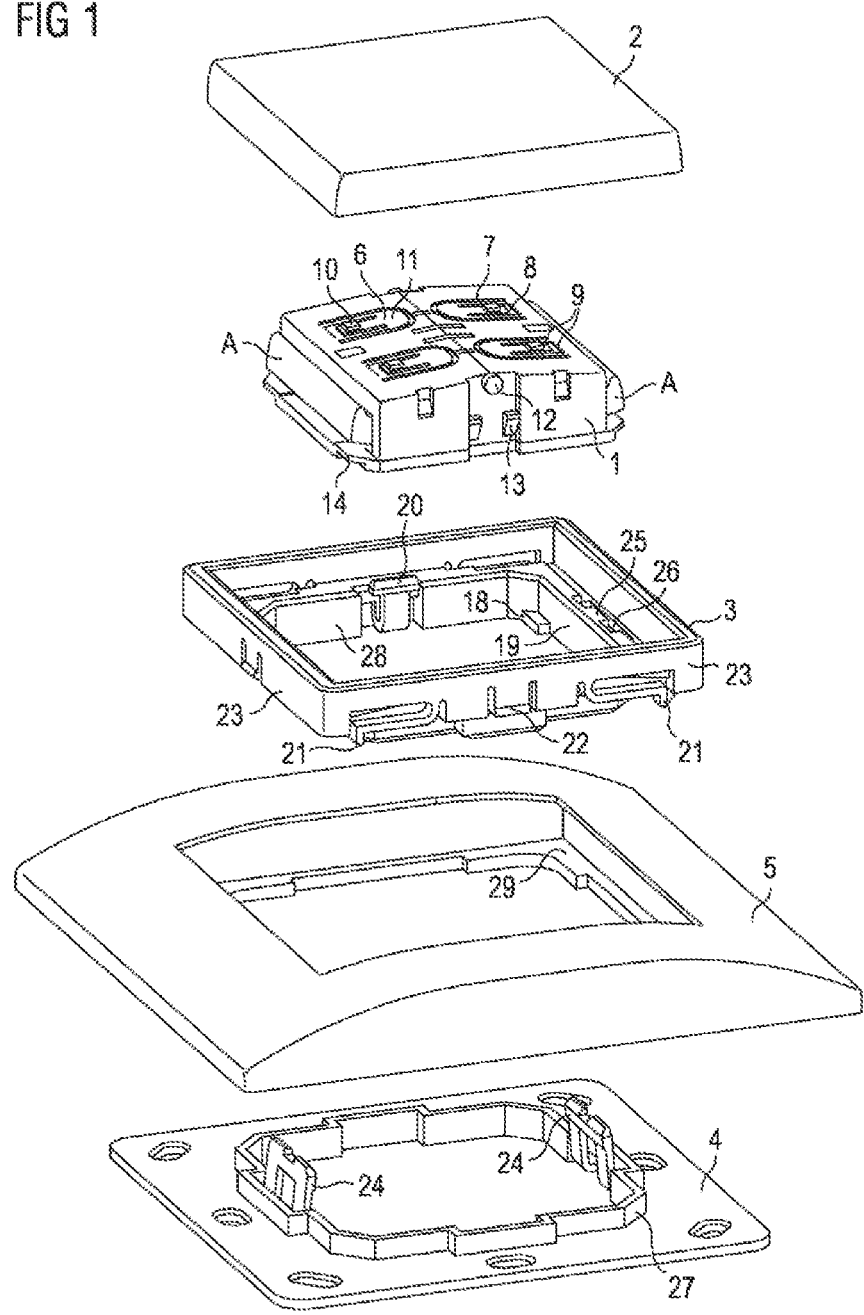
FIG. 1 shows an exploded representation of an embodiment of a radio system.

FIG. 1 shows an exploded representation of an embodiment of an autonomous-power radio system of the type explained, which in this case is embodied as a radio switch for surface installation by way of example. In particular, FIG. 1 shows a module housing 1, a rocker switch 2, an intermediate frame 3 and a baseplate 4, as can be assembled jointly with a decorative frame 5. An electronic module is set up in the module housing 1. The module housing 1 has four operating elements 6 that can be used to operate switching elements or contacts (not shown explicitly) of electronics, e.g. on a board, of the module seated in the module housing, in order to be able to code a mode of operation or user operation on the radio module. By way of example, the radio system could be used to control ceiling lighting in a room, the switch positions of the switching elements (activated by means of the operating elements 6) being able to be used to perform functions such as ON, OFF or DIM.

The module in the module housing 1 has not only the electronics for identifying operation of a switching element by means of an operating element 6 but also a processor and a radio frequency transmission unit. The processor processes the operation of the individual switching elements that is sensed by means of the electronics to produce logic signals and codes the latter into a radio message. In addition, further information, such as an identification number of the radio system, timestamps, transmission channel information, etc., can be embedded into the radio message. The radio message is then encrypted and conditioned for sending in accordance with a prescribed protocol structure. The telegram data of the radio message that are produced can then be sent from the module to one or more receiver systems by radio via the transmission unit and an antenna.

The radio system represented in FIG. 1 additionally has an energy converter that is embodied as an electrodynamic energy converter, for example. To this end, the module housing 1 has a respective trip element A on two opposite sides. The trip elements A are embodied as levers and can be operated by means of the rocker switch 2. By way of example, the trip elements A of the energy converter are operated by means of the mechanical energy introduced via the rocker switch 2 at an operating force of between 5 and 10 N over an operating path of between 1 mm and 3 mm at room temperature. One embodiment can have an operating path of 1.8 mm at an operating force of 8 N, for example.

The trip elements A can be used to excite the energy converter, which is used as a power supply for the radio system. In this case, each instance of operation of the rocker switch 2 and resultant operation of one of the trip elements A prompt the conversion of sufficient mechanical energy into electric power, so that the radio system can be operated. By way of example, the trip elements A can each carry a permanent magnet or an electrical coil that are moved relative to the respective other element (permanent magnet or coil) on the basis of the mechanical movement, so that induction produces an electric current pulse that is converted into stable direct current by means of a converter and forms the operating power for the other electronic components of the module.

The processor of the module could also identify and code the position or operation of the individual trip elements A, so that this information can likewise be transmitted to a receiver system in a radio message. In addition, the various directions of movement of the respective trip elements A can be detected and can be processed by means of the processor. In this way, a module for surface installation is formed that is set up as an autonomous-power radio system for sending radio messages to receiver systems, e.g. as light switches for ceiling lighting.

The mechanical embodiment of the other elements is explained in more detail below. The operating elements 6 of the module housing 1 are formed from a surface of the module housing 1. To this end, at each operating element 6, a first U-shaped recess 7 and a second U-shaped recess 8 are taken from the surface of the module housing 1. The U-shaped recess 7 and the U-shaped recess 8 are each directed inversely in relation to one another, so that a type of W-shaped operating element 6 is formed.

The operating elements 6 can be deformed and bent inward, i.e. into the module housing 1, by means of an operating force on the rocker switch 2 and corresponding elements on the rocker switch 2 (not shown), so that they interact with switching elements of the corresponding electronics at points 10 and said switching elements make contact with electrical contacts on the board—as explained above. In this way, operating the rocker switch 2 at different points on the module produces coding for different modes of operation.

The special embodiment of the operating elements 6 means that excess travel is possible. This excess travel may be necessary in order to increase the life of the switching elements of the electronic module that are fitted beneath the point at which force is exerted 11. In particular, the excess travel may also be advantageous, since—as explained above—the electronic module has a power supply formed for it that takes the mechanical energy introduced by the rocker switch 2 and forms the electric power that is necessary for supplying power to the electronic module. This requires the provision of a sufficiently long path for the switching movement, which, without excess travel, would have a negative effect on the life of the switching elements of the electronic module. For this reason, the excess travel achieved is particularly advantageous.

For the purpose of holding the rocker switch 2, a cylindrical rocker holder 12 is formed, into which the rocker switch 2 latches with latch elements (not shown) that are provided only for this purpose. The cylindrical shape of the rocker holder 12 and the latch elements partially surrounding it form an axis that is an axis of rotation for the rocking movement of the rocker switch 2. The rocker switch 2 itself has elevations (not shown) for operating the operating elements 6, which elevations exert the necessary force and movement on the switching elements of the electronic module by means of the operating elements 6.

The module housing 1 additionally has seating points 14 that act to precisely center the module housing 1 in relation to the intermediate frame 3. These seating points of the module housing 1 are preferably formed in the corners, so that exact centering of the module housing 1 in the intermediate frame 3 is possible.

In a manner corresponding to the seating points 14, support points 18 are formed on the intermediate frame 3. These are formed so as to positively interlock. The positively locking embodiment of the support points 18 with seating points 14 allows the module housing 1 to be arranged in centered fashion in the intermediate frame 3. The module housing 1 is mounted on the intermediate frame 3 by virtue of first latching hooks 20 that are arranged resiliently on the inside 19 of the intermediate frame 3. Advantageously, these latching hooks 20 are arranged opposite one another. These latching hooks 20 correspond to the latching lugs 13 on the module housing 1. This allows the module housing 1 to be connected to the intermediate frame 3 in positively locking fashion without play or wobble.

The intermediate frame 3 is for its part connected to the baseplate 4. This connection is formed by second latching hooks 24 and second latching elements 25 with recesses 26. In this case, level compensation is formed by means of spring elements 21. In addition, centering in relation to the decorative frame 5 is ensured by spring elements 22. This is necessary because the inner cutout on the decorative frame 5 has size tolerances, in principle. The centering achieved by means of the spring elements 23 achieves uniform clearances with respect to the decorative frame 5. The spring elements 22 are arranged on the outside 23 of the intermediate frame 3 in this case.

The intermediate frame 3 and the baseplate 4 have two corresponding centering rims, which means that exact centering is possible by virtue of the first centering rim 27 on the baseplate with the second centering rim 28 on the intermediate frame. Arranged between the two elements, the intermediate frame 3 and the baseplate 4, is the decorative frame 5. The spring elements 21 and the latching elements 24 and latching lugs 25 produce a connection between intermediate frame and baseplate 4, which additionally hold the decorative frame 5 by making use of the mounting rim 29 that is always present on the latter. Any differences in the level of the mounting rim 29 are compensated for by the spring elements 21.

In this way, a module housing 1 having a radio module of the type explained integrated therein can be integrated into standardized frames for a surface installation in a simple manner. Thus, conventional switches, such as light switches, shutter switches, thermostat switches, window actuator switches, etc., can be smartly extended by the functionalities of the electronic radio module by means of a form factor of the module housing 1 that it is possible to integrate into the switch housing.

Naturally, it is also conceivable for a module having a corresponding module housing 1 to be used in other user or switch applications and housing designs. In this respect, the module having the form factor represented in FIG. 1 for the module housing 1 can be considered in isolation from the other installation and frame portions from FIG. 1.

Figure 2:
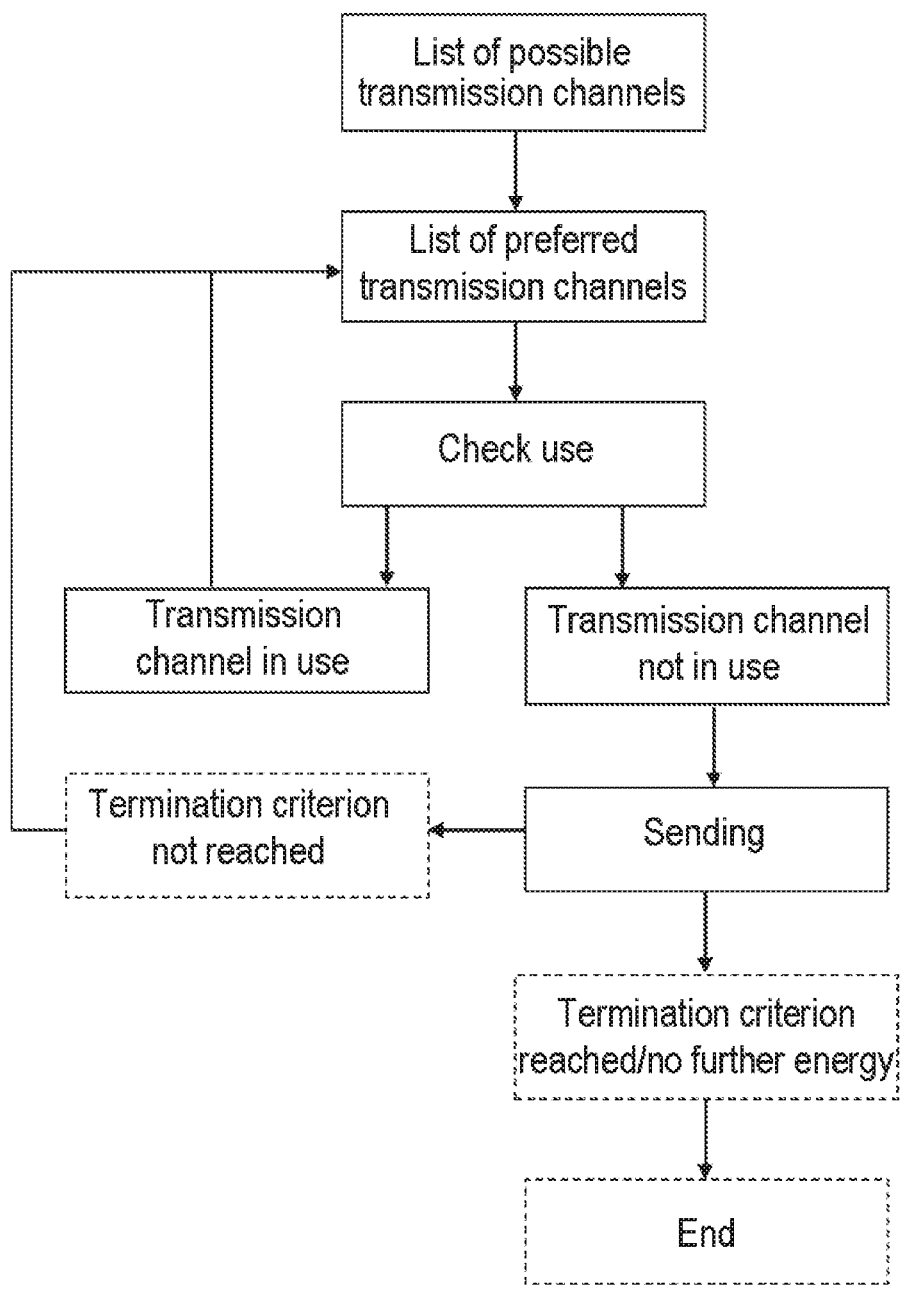
FIG. 2 shows a schematic method sequence for a method for sending messages in a transmitter-end autonomous-power radio system.

FIG. 2 shows a schematic sequence for a possible method for sending messages in an autonomous-power radio system of the type explained here. By way of example, the method is implemented in an electronic module, as explained in relation to FIG. 1. By way of example, the method may be stored as a sequential program and executed by means of the processor in the module.

Initially, a list of possible preset transmission channels is stored in the radio system. By way of example, the list contains a multiplicity of transmission channels having a prescribed bandwidth in a popular transmission standard, e.g. according to the IEEE 802.15.4 standard. In this case, a frequency range between 2.4 GHz and 2.4835 GHz, for example, can be considered. However, it is alternatively or additionally conceivable also to consider and to cover a frequency range between 5.725 GHz and 5.875 GHz.

From this list of possible transmission channels, a list containing one or more preferred transmission channels is created. By way of example, the preferred transmission channels can be selected on the basis of statistical considerations or selected on the basis of other criteria, such as on the basis of channel-dependent and/or temporary (i.e. e.g. instantaneous or temporally distinguishable) criteria or on the basis of predetermined instants. It is also possible for an interference level or generally a signal level to be used, if need be in combination with or as an alternative to the above criteria. It is also possible to ascertain for each possible transmission channel, on the basis of possibly repeated checking on a channel use, i.e. monitoring of the channel, whether another radio signal is currently being transmitted, a statistical probability of use of the transmission channel or further gauges on the basis of the above criteria (i.e. on the basis of the bandwidth of the channel and/or the time and/or a signal level). From this, it is then possible to make a decision as regards whether or not a transmission channel is preferred.

Transmission channels having a low probability of use or having good or favorable properties for the purposes of the above criteria are selected as preferred channels. The channel availability thereof, despite coexisting other radio systems, is increased in comparison with that of other transmission channels having a possibly higher probability of use or poorer or less favorable properties for the purposes of the above criteria. Robust data interchange between the present radio system and receiver systems on the preferred transmission channels is therefore easier to achieve than on other transmission channels. Besides the probability of use and criteria of the type explained above, it is also possible to use other parameters, e.g. an interference sensitivity, signal-to-noise ratios, power spectral densities or the like.

An advantageous scenario based on the method is presented below. From the list of preferred transmission channels, a first transmission channel is checked for use. To this end, the radio system switches the antenna to reception and monitors the transmission channel for whether radio frequency signals are currently passing via the transmission channel. If said transmission channel is not in use, this transmission channel is used for sending.

Subsequently or if the first preferred transmission channel is in use, further transmission channels from the list of preferred transmission channels are iteratively checked until a termination criterion is reached. This termination criterion can be defined in that either an upper limit of transmissions has taken place, the list has been checked through completely or the available electric operating power has been consumed. When the termination criterion is reached, the method is aborted or terminated.

The power for the method is provided by an energy converter from nonelectrical ambient energy. This may be e.g. an electrodynamically excited energy converter, particularly an induction converter as explained above in relation to FIG. 1. On account of the low power requirement for the use check, the electric power from the energy converter is sufficient for repeatedly performing the above measures on the basis of a single instance of operation of the radio system with short operating paths and/or low operating forces, e.g. by means of a rocker switch 2 (cf. FIG. 1). It is thus usually possible to check between two and four transmission channels and also accordingly to transmit two to four radio messages. Hence, radio messages are usually transmitted on different frequencies of different transmission channels. Ideally, these include at least one transmission channel that is not in use, so that the radio message can be sent successfully. There is therefore increased probability of at least one of these radio messages being received by the associated receiver system.

Preferably, the transmission frequency chosen is a transmission channel from a free 2.4 GHz band. In the case of operation in the 2.4 GHz band, the list of preferred transmission channels should advantageously contain particularly such transmission channels as are not used by the IEEE 802.11 standard (WLAN or WiFi). Such transmission channels as have only low statistical use can also be considered. The method for ascertaining the statistical use is explained above. It is particularly advantageous if the first preferred transmission channel that is checked is a channel that is not used by the IEEE 802.11 standard or has only low statistical use.

The measures explained above have the advantage that there is nevertheless sufficient operating power produced at the transmitter end in a radio system whose form factor may be embodied e.g. as shown in FIG. 1 (cf. module housing 1) and that is excited by means of short/low mechanical operating paths and/or forces. In addition, an advantageous choice of channel can be made for transmission channels, so that clash-free data transmission is possible in radio networks despite a possible multiplicity of coexisting radio systems.

When using a method for sending messages in an autonomous-power radio system of the type explained here, it makes sense and is important to make a choice of transmission channel on the basis of an instantaneous decision, i.e. on the basis of a decision about the momentarily or presently available circumstances on a transmission channel (e.g. use) on the basis of the criteria explained above, advantageously on the basis of the bandwidth of the channel and/or the time and/or a signal level. An autonomous-power radio system can be activated by operation of an operating element and can use present circumstances on the checked transmission channels to decide which transmission channel appears most favorable at this instant. This transmission channel can then be chosen for sending a radio message.

In connection with the method sequence from FIG. 2, a return channel from one or more receiver systems to the respectively sending radio system may also be provided and set up. The return channel allows a receiver system to return to the sending radio system e.g. information about a channel use or channel selection (choice) in the receiver system. This has the advantage that the sending radio system can coordinate a choice of transmission channel also on the basis of such information and criteria as are presently and/or statistically available in a receiver system. A return via the return channel can be made after a predetermined period of time, for example, or in combination with a possibly protocol-dependent ACK signal that is expected by the radio system.

Figure 3:
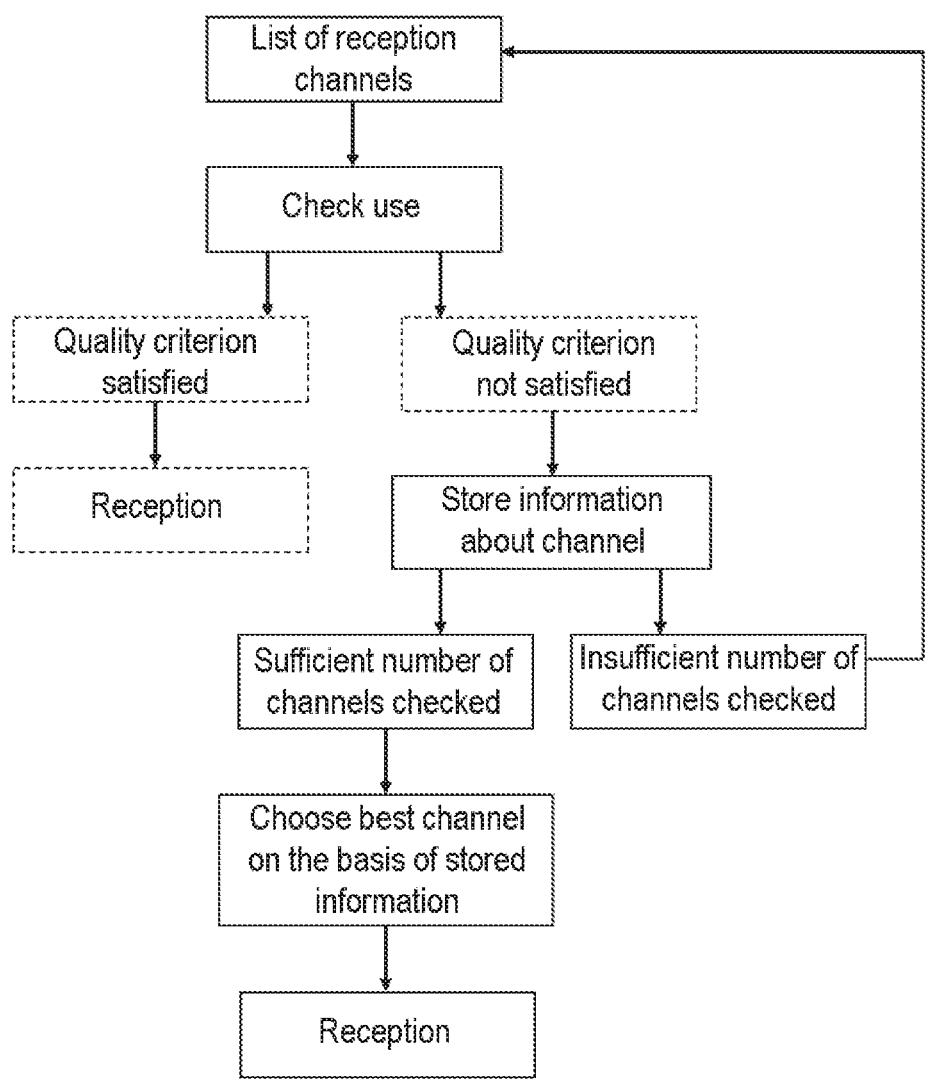
FIG. 3 shows a schematic method sequence for a method for ascertaining a suitable reception channel of a receiver system.

FIG. 3 shows a schematic sequence for a possible method for ascertaining a suitable reception channel of a receiver system of the type explained here. An advantageous scenario based on the method is presented below in a reception system.

From a list of possible reception channels, a first reception channel is checked for use thereof over a time T. Besides a current use, it is alternatively or additionally also possible to use a rate of use or probability of use, or else criteria on the basis of the respective bandwidth of the reception channel and/or the time (e.g. instantaneous or temporally distinguishable criteria) and/or a signal level on the reception channel. In general, a statistical channel availability is therefore ascertained.

If this channel availability meets a prescribed criterion (e.g. quality criterion for a reception quality, low interference sensitivity, low noise power spectral density, etc.), that is to say if a quality criterion is satisfied, then the method is terminated immediately and this reception channel is subsequently used to receive (cf. left-hand path in FIG. 3 starting from the "Check use" block).

Should the checked reception channel fail to satisfy the prescribed quality criterion (cf. right-hand path in FIG. 3 starting from the "Check use" block), then the ascertained (statistical) information (e.g. use or probability of use or other gauges) of the reception channel is stored and the further reception channels from the list of possible reception channels are iteratively checked. This can be done for all reception channels or up to a stipulated sufficient upper limit. Should one of these reception channels subsequently satisfy the prescribed criterion, the method is terminated and the channel is retained as the reception channel. Should none of the channels satisfy the prescribed criterion, then the stored information is taken to the basis for ascertaining the most suitable or best channel for the purposes of the above criteria and stipulations and for subsequently choosing it as a reception channel.

It is conceivable for the method to be performed even without a separate decision about a quality criterion. In this case, the blocks represented in dashes in FIG. 3 would be dispensed with and there would be a direct transition from the "Check use" block to the "Store information about channel" block.

In this case, one possible arrangement for performing the method has a logic unit and a receiver that is suitable for receiving on all reception channels in the list of possible reception channels simultaneously. Alternatively, it is also possible to use a plurality of receivers in order to receive/listen to a plurality of or all channels from the list of possible channels in parallel.

The above measures on a receiver system have the advantage that reception channels having advantageous statistical properties can be used for a signal transmission. A receiver system can gear itself up for the choice of channel in a sending radio system, making allowance for the momentary circumstances, such as e.g. utilization of channels by coexisting radio systems and standards. At the same time, the methods explained allow energy-efficient performance in interaction with structural/mechanical form factors of corresponding radio systems. Particularly in the case of autonomous-power radio systems that are presented here, the electric power obtained from a single instance of mechanical operation is sufficient for performing channel matching. Specifically in the frequently used free 2.4 GHz band of free radio standards, it is therefore possible to implement low-interference data transmission.

The method in FIG. 3 can be performed repeatedly, if need be periodically at fixed or variable instants, e.g. on an hourly basis. It is also conceivable for individual steps of the method to be performed at different times or after time periods of different length. It would thus be possible to perform e.g. a check on use of a channel on an hourly basis, while an actual choice of channel is made e.g. only on a weekly basis.

When using a method for ascertaining a suitable reception channel of a receiver system of the type explained here, it makes sense and is important to make a choice of reception channel on the basis of a statistical survey, i.e. on the basis of longer-term criteria and stipulations. In contrast to a transmitter-end instantaneous decision in autonomous-power radio systems, in receiver systems (which are advantageously cabled and are continually activated) it is possible to ascertain statistics about the properties of the available reception channels on the basis of checks and measurements on corresponding reception channels using the above criteria. These statistics allow a decision about a choice of reception channel for the purposes of historical acquisition of predetermined properties of the reception channels.

In sequence structures—not shown, for the above methods, it is also conceivable for a transmitter-end initialization method of the type explained above, comprising transmission of initialization messages on different frequencies or different transmission channels, to be combined with a method of choosing a transmission channel on the basis of a check on a use of the individual transmission channels.

In addition, it is conceivable for the methods presented and explained for sending messages in an autonomous-power radio system (i.e. method at transmitter end) and the methods presented and explained for ascertaining a suitable reception channel of a receiver system (i.e. method at receiver end) to be combined in an overall method.

In addition, it is conceivable for the presented embodiments of a radio system and of a receiver system to be combined in an overall arrangement comprising one or more radio systems and one or more receiver systems.

All of the embodiments and sequence structures presented are used for explanation and are chosen merely by way of example.

LIST OF REFERENCE SYMBOLS

1 Module housing
2 Rocker switch
3 Intermediate frame
4 Baseplate
5 Decorative frame
6 Operating element
7 Outer U-shaped recess
8 Inner U-shaped recess
10 Point at which force takes effect
11 Point at which force is exerted
12 Rocker holder
13 Latching lug
14 Seating points
18 Support points
19 Inside of the intermediate frame
20 First latching hook
21 First spring elements
22 Second spring elements
23 Outside of the intermediate frame
24 Second latching hook
25 Second latching element
26 Recesses
27 First centering rim
28 Second centering rim
29 Mounting rim
A Trip element of the energy converter

The invention claimed is:

1. A method for sending messages in an energy self-sufficient radio system, wherein electric power for the radio system is provided by an energy converter that converts nonelectrical primary energy from the environment into electric power, comprising the following steps:
   a.) storage of at least two transmission channels in a predetermined frequency range in the radio system,
   b.) presetting of a transmission unit of the radio system to a preferred stored transmission channel,
   c.) checking of a use of the preferred transmission channel by other radio systems,
   d.) changing from the preferred transmission channel to another stored transmission channel if the preferred transmission channel is in use, and
   e.) sending of a predetermined radio message by the transmission unit on the preferred or the other transmission channel on the basis of step d.),
   wherein the energy converter is excited by mechanical operation of an operating element of the radio system, as a result of which electric power for performing the method is provided, and wherein each operation of the operating element prompts the performance of at least steps c.) to e.),
   wherein one or more of steps c.) to e.) are repeatedly performed for the preferred transmission channel and/or for at least one further stored transmission channel, and
   wherein, for each stored transmission channel, repeated checking of the use according to stet c.) is used to ascertain a statistical probability of use, and a stored transmission channel having the lowest probability of use is set as the preferred transmission channel according to step b.).

2. The method according to claim 1, wherein stored transmission channels are erased if the statistical probability of use thereof exceeds a predetermined limit value.

3. The method according to claim 2, wherein, for one or more nonstored transmission channels, repeated checking of the use is used to ascertain a statistical probability of use, and the transmission channels are stored according to step a.) if the statistical probability of use thereof is below the predetermined limit value.

4. The method according to claim 1, wherein a list of the stored transmission channels is stored in the radio system, and the list is processed in a predetermined order.

5. The method according to claim 1, wherein the method is terminated after a predetermined number of sending processes according to step e.).

6. The method according to claim 1, wherein the predetermined frequency range has transmission frequencies between 2.4 GHz and 2.4835 GHz and/or transmission frequencies between 5.725 GHz and 5.875 GHz.

7. The method according to claim 1, wherein the radio system stores an identification number for identifying the radio system, which identification number is transmitted on each sending of a radio message by the transmission unit according to step e.).

8. The method according to claim 1, wherein one or more instructions and/or options for a receiver system are coded in the radio message.

9. The method according to claim 1, wherein a return channel from a receiver system to the radio system is used to transmit information about a channel use and/or channel selection (choice) in the receiver system to the radio system.

10. A radio system comprising:
an energy converter to convert nonelectrical primary energy from the environment into electric power, wherein the energy converter can be excited by a mechanical operation of an operating element of the radio system,
a switching element to convert mechanical operation of the operating element into a logic signal and to generate a predetermined radio message therefrom,
a transmitter to send the predetermined radio message on one or more transmission channels stored in the radio system, and
a processor configured to:
store a list of the one or more transmission channels,
determine whether a preferred transmission channel is in use by a second radio system,
transmit, responsive to the preferred transmission channel being in use, the predetermined radio message by the transmitter on one of the at least two transmission channels,
repeatedly check, for each transmission channel stored in the list of the one or more transmission channels, whether the transmission channel is in use by a second radio system to ascertain a corresponding statistical probability of use, and
set as the preferred transmission channel, a transmission channel in the list of the one or more transmission channels having a lowest statistical probability of use.

11. The radio system of claim 10, further comprising a receiver system having a receiver and a logic unit, wherein the receiver is designed to receive on the one or more transmission channels simultaneously.

12. The radio system of claim 10, further comprising a receiver system having one or more receivers and a logic unit, wherein each of the one or more receivers is configured to receive on a respective one or more transmission channels.

13. A method comprising:
ascertaining a suitable reception channel of a receiver system in an energy self-sufficient radio system, wherein electric power for the radio system is provided by an energy converter that converts nonelectrical primary energy from the environment into electric power, comprising the steps of:
a.) storage of at least two reception channels in a predetermined frequency range in a receiver system,
b.) presetting of a reception unit of the receiver system to a preferred stored reception channel,
c.) ascertainment of a statistical channel availability of the stored reception channels on the basis of repeated checking of a reception signal level of each stored reception channel,
d.) selection of a stored reception channel having a highest channel availability as the preferred reception channel; and sending messages in the energy self-sufficient radio system, comprising the following step:
e.) storage of at least two transmission channels in a predetermined frequency range in the radio system,
f.) presetting of a transmission unit of the radio system to a preferred stored transmission channel,
g.) checking of a use of the preferred transmission channel by other radio systems,
h.) changing from the preferred transmission channel to another stored transmission channel if the preferred transmission channel is in use, and
i.) sending of a predetermined radio message by the transmission unit on the preferred or the other transmission channel on the basis of step h.);
wherein the energy converter is excited by mechanical operation of an operating element of the radio system, as a result of which electric power for performing the method is provided, and wherein each operation of the operating element prompts the performance of at least steps g.) to i.),
wherein the energy converter is excited electrodynamically by a mechanical operation of a rocker switch as an operating element of the radio system, and as a result the mechanical energy introduced via the rocker switch is converted into electric power for supplying power to the radio system, and
wherein a trip element of the energy converter is operated by means of the mechanical energy introduced via the rocker switch at an operating path of between 0.5 mm and 10 mm at room temperature.

14. The method according to claim 13, wherein for each stored reception channel to channel availability is compared with a prescribed quality criterion and the method is immediately terminated on ascertainment of a reception channel having a channel availability that satisfies the prescribed quality criterion, and this reception channel is chosen as the preferred reception channel.

15. The method according to claim 13, wherein one or more of steps g.) to i) are repeatedly performed for the preferred transmission channel and/or for at least one further stored transmission channel.

16. The method according to claim 15, wherein, for each stored transmission channel, repeated checking of the use according to step g.) is used to ascertain a statistical probability of use, and a stored transmission channel having the lowest probability of use is set as the preferred transmission channel according to step f.).

17. The method according to claim 16, wherein stored transmission channels are erased if the statistical probability of use thereof exceeds a predetermined limit value.

18. The method according to claim 17, wherein, for one or more nonstored transmission channels, repeated checking of the use is used to ascertain a statistical probability of use, and the transmission channels are stored according to step e.) if the statistical probability of use thereof is below the predetermined limit value.

19. The method according to claim 13, wherein a list of the stored transmission channels is stored in the radio system, and the list is processed in a predetermined order.

20. The method according to claim 13, wherein the method is terminated after a predetermined number of sending processes according to step i.).

21. The method according to claim 13, wherein the predetermined frequency range has transmission frequencies between 2.4 GHz and 2.4835 GHz and/or transmission frequencies between 5.725 GHz and 5.875 GHz.

22. The method according to claim 13, wherein the radio system stores an identification number for identifying the radio system, which identification number is transmitted on each sending of a radio message by the transmission unit according to step i.).

23. The method according to claim 13, wherein one or more instructions and/or options for a receiver system are coded in the radio message.

24. The method according to claim 13, wherein a return channel from a receiver system to the radio system is used to transmit information about a channel use and/or channel selection (choice) in the receiver system to the radio system.

25. A method for sending messages in an energy self-sufficient radio system, wherein electric power for the radio system is provided by an energy converter that converts nonelectrical primary energy from the environment into electric power, comprising the following steps:
   a.) storing at least two transmission channels in a predetermined frequency range in the radio system,
   b.) presetting of a transmission unit of the radio system to a preferred stored transmission channel,
   c.) checking of a use of the preferred transmission channel by other radio systems,
   d.) changing from the preferred transmission channel to another stored transmission channel if the preferred transmission channel is in use, and
   e.) sending of a predetermined radio message by the transmission unit on the preferred or the other transmission channel on the basis of step d.),
   wherein the energy converter is excited by mechanical operation of an operating element of the radio system, as a result of which electric power for performing the method is provided, and wherein each operation of the operating element prompts the performance of at least steps c.) to e.);
   wherein the energy converter is excited electrodynamically by a mechanical operation of a rocker switch as an operating element of the radio system, and as a result the mechanical energy introduced via the rocker switch is converted into electric power for supplying power to the radio system, and
   wherein a trip element of the energy converter is operated by means of the mechanical energy introduced via the rocker switch at an operating path of between 0.5 mm and 10 mm at room temperature.

26. The method according to claim 25, wherein one or more of steps c.) to e) are repeatedly performed for the preferred transmission channel and/or for at least one further stored transmission channel.

27. The method according to claim 26, wherein, for each stored transmission channel, repeated checking of the use according to step c) is used to ascertain a statistical probability of use, and a stored transmission channel having the lowest probability of use is set as the preferred transmission channel according to step b).

28. The method according to claim 27, wherein stored transmission channels are erased if the statistical probability of use thereof exceeds a predetermined limit value.

29. The method according to claim 28, wherein, for one or more nonstored transmission channels, repeated checking of the use is used to ascertain a statistical probability of use, and the transmission channels are stored according to step a.) if the statistical probability of use thereof is below the predetermined limit value.

30. The method according to claim 25, wherein a list of the stored transmission channels is stored in the radio system, and the list is processed in a predetermined order.

31. The method according to claim 25, wherein the method is terminated after a predetermined number of sending processes according to step e.).

32. The method according to claim 25, wherein the predetermined frequency range has transmission frequencies between 2.4 GHz and 2.4835 GHz and/or transmission frequencies between 5.725 GHz and 5.875 GHz.

33. The method according to claim 25, wherein the radio system stores an identification number for identifying the radio system, which identification number is transmitted on each sending of a radio message by the transmission unit according to step e.).

34. The method according to claim 25, wherein one or more instructions and/or options for a receiver system are coded in the radio message.

35. The method according to claim 25, wherein a return channel from a receiver system to the radio system is used to transmit information about a channel use and/or channel selection (choice) in the receiver system to the radio system.

* * * * *